(12) United States Patent
Bloesch (10) Patent No.: US 7,831,625 B2
(45) Date of Patent: Nov. 9, 2010

(54) DATA MODEL FOR A COMMON LANGUAGE

(75) Inventor: Anthony Christopher Bloesch, Vashon, WA (US)

(73) Assignee: Microsoft Corporation, Redmond, WA (US)

( * ) Notice: Subject to any disclaimer, the term of this patent is extended or adjusted under 35 U.S.C. 154(b) by 428 days.

(21) Appl. No.: 11/749,607

(22) Filed: May 16, 2007

(65) Prior Publication Data

US 2008/0288510 A1 Nov. 20, 2008

(51) Int. Cl.
G06F 17/30 (2006.01)
(52) U.S. Cl. ........................ 707/796; 717/104
(58) Field of Classification Search ................... 707/796
See application file for complete search history.

(56) References Cited

U.S. PATENT DOCUMENTS

| | | | |
|---|---|---|---|
| 5,581,755 A | 12/1996 | Koerber |
| 5,737,591 A | 4/1998 | Kaplan |
| 5,878,432 A | 3/1999 | Misheski |
| 5,950,209 A | 9/1999 | Carrier |
| 5,978,811 A | 11/1999 | Smiley |
| 6,038,393 A | 3/2000 | Iyengar et al. |
| 6,167,405 A | 12/2000 | Rosensteel |
| 6,173,439 B1 | 1/2001 | Carlson |
| 6,240,416 B1 | 5/2001 | Immon et al. |
| 6,381,743 B1 | 4/2002 | Mutschler, III |
| 6,460,052 B1 | 10/2002 | Thomas |
| 6,532,588 B1 | 3/2003 | Porter |
| 6,578,037 B1 | 6/2003 | Wong et al. |
| 6,598,219 B1 | 7/2003 | Lau |
| 6,662,188 B1 | 12/2003 | Rasmussen et al. |
| 6,681,382 B1 | 1/2004 | Kakumani |
| 6,745,332 B1 | 6/2004 | Wong et al. |
| 6,874,146 B1 | 3/2005 | Iyengar |
| 6,920,458 B1 | 7/2005 | Chu et al. |
| 6,959,326 B1 | 10/2005 | Day |
| 6,978,281 B1 | 12/2005 | Kruy |
| 6,996,558 B2 | 2/2006 | Dettinger |
| 7,028,057 B1 | 4/2006 | Vasudevan |
| 7,076,496 B1 | 7/2006 | Ruizandrade |
| 7,120,898 B2 | 10/2006 | Grover et al. |
| 7,133,871 B2 | 11/2006 | Sluiman |
| 7,143,091 B2 | 11/2006 | Charnock |
| 7,146,355 B2 | 12/2006 | Chu-Carroll |
| 7,146,606 B2 | 12/2006 | Mitchell et al. |
| 7,155,703 B2 | 12/2006 | Meijer et al. |

(Continued)

OTHER PUBLICATIONS

Venkatrao, SQL/CLI A New Binding Style for SQL, SIGMOD Record, vol. 24, No. 4, Dec. 1995, pp. 72-77.*

(Continued)

*Primary Examiner*—James Trujillo
*Assistant Examiner*—Albert Phillips
(74) *Attorney, Agent, or Firm*—Workman Nydegger (57) ABSTRACT

Embodiments and principles described herein relate to software repositories for common languages. Embodiments include maintaining database schema and structures which comprise application framework information and provides for the storage, querying, and retrieval of an abstraction of a namespace corresponding to an application framework. Embodiments also provide for the storage, querying and retrieval of information corresponding to parameters of methods within an application framework. Embodiments also include the storage, querying and retrieval of information corresponding to type information for constructed types within an application framework.

14 Claims, 8 Drawing Sheets

U.S. PATENT DOCUMENTS

| | | | |
|---|---|---|---|
| 7,168,063 | B2 | 1/2007 | Meijer |
| 7,213,037 | B2 | 5/2007 | Rangadass |
| 7,349,913 | B2 | 3/2008 | Clark et al. |
| 7,558,781 | B2 | 7/2009 | Probst |
| 2002/0087665 | A1 | 7/2002 | Marshall |
| 2002/0184194 | A1 | 12/2002 | Yoon |
| 2003/0079107 | A1 | 4/2003 | Booth |
| 2003/0225768 | A1 | 12/2003 | Chaudhuri |
| 2004/0010776 | A1* | 1/2004 | Shah ........................ 717/117 |
| 2004/0167899 | A1 | 8/2004 | Patadia |
| 2004/0167920 | A1 | 8/2004 | Owen |
| 2004/0186836 | A1 | 9/2004 | Schlesinger |
| 2004/0193594 | A1 | 9/2004 | Moore |
| 2004/0193912 | A1 | 9/2004 | Li et al. |
| 2004/0199867 | A1 | 10/2004 | Brandenborg |
| 2004/0260691 | A1 | 12/2004 | Desai et al. |
| 2005/0044089 | A1* | 2/2005 | Wu et al. .................... 707/100 |
| 2005/0050053 | A1* | 3/2005 | Thompson ................. 707/100 |
| 2006/0026168 | A1 | 2/2006 | Bosworth et al. |
| 2006/0041661 | A1 | 2/2006 | Erikson et al. |
| 2006/0112129 | A1 | 5/2006 | Kostojohn |
| 2007/0055680 | A1 | 3/2007 | Statchuk |
| 2007/0073673 | A1 | 3/2007 | McVeigh et al. |
| 2007/0073776 | A1 | 3/2007 | Kalalian et al. |
| 2007/0156687 | A1 | 7/2007 | Idicula et al. |
| 2007/0192374 | A1 | 8/2007 | Abnous |
| 2007/0208744 | A1 | 9/2007 | Krishnaprasad et al. |
| 2007/0255677 | A1 | 11/2007 | Alexander |
| 2007/0276851 | A1 | 11/2007 | Friedlander et al. |
| 2008/0177692 | A1 | 7/2008 | Bloesch |
| 2008/0201330 | A1 | 8/2008 | Bloesch |
| 2008/0320377 | A1 | 12/2008 | Seetharamakrishnan et al. |

OTHER PUBLICATIONS

Ort and Bhakti, Java Architecture for XML Binding, Mar. 2003, pp. 1-12.*
McCluskey, Using Java Reflection, Jan. 1998, pp. 1-8.*
Haggar, Java bytecode: Understanding bytecode makes you a better programmer, Jul. 1, 2001, pp. 1-9.*
What's on the CD? O'Reilly VB.NET Core Classes in a Nutshell for Visual Studio .NET Version 1.0, 2002, pp. 1-6.*
Pierre-Alain Muller, Franck Fleurey, Didier Vojtisek, Zoe Drey, Damien Pollet, Frederic Fondement, Philippe Studer and Jean-Marc Jezequel, "On Executable Meta-Languages applied to Model Transformations," [online] Date Unknown, [retrieved on Dec. 4, 2006], pp. 1-48. Retrieved from the Internet: http://www.irisa.fr/triskell/publis/2005/Muller05c.pdf.
Branko Milosavljevic, Milan Vidakovic, Srdjan Komazec and Gordana Milosavljevic, Faculty of Engineering, University of Novi Sad, Yugoslavia "User Interface Code Generation For EJB-Based Data Models Using Intermediate Form Representations," [online] Copyright 2003, PPPJ Jun. 16-18, 2003, Kilkenny City, Ireland, [retrieved on Dec. 4, 2006], pp. 125-128. Retrieved from the Internet: http://delivery.acm.org/10.1145/960000/957327/p125-milosavljevic.pdf?key1=957327&key2=4411925611&coll=GUIDE&dI=GUIDE&CFID=75919783&CFTOKEN=92791909.
Neel Sundaresan and Reshad Moussa, NehaNet Corp., San Jose, California, "Algorithms and Programming Models for Efficient Representation of XML for Internet Applications," [online] WWW10, May 1-5, 2001, [retrieved on Dec. 4, 2006], pp. 366-375. Retrieved from the Internet: http://delivery.acm.org/10.1145/380000/372090/p366-sundaresan.pdf?key1=372090&key2=4204925611&coll=ACM&dl-ACM&CFID=75919783&CFTOKEN=92791909.
Aske Simon Christensen, Anders Moller and Michael I. Schwartzbach, University of Aarhus, Denmark, "Extending Java for High-Level Web Service Construction," [online] ACM Transactions on Programming Languages and Systems, vol. 25, No. 6, Nov. 2003, [retrieved on Dec. 4, 2006], pp. 814-875, Retrieved from the Internet: http://delivery.acm.org/10.1145/950000/945890/p814-s_christensen.pdf?key1=945890&key2=3681925611&coll=ACM&dl=ACM&CFID=75919783&CFTOKEN=92791909.
Microsoft SOA & Business Process, "Oslo", 2007, 1 page.
MSDN, "Oslo" Repository Architecture, 2009, 23 pages.
Tangsripairoj, Songsri, et al., "Organizing and Visualizing Software Repositories Using the Growing Hierarchical Self-Organizing Map", Journal of Information Science and Engineering 22, 283-295 (2006), Nov. 2005, pp. 283-295.
Rose, Thomas, et al., "Organizing Software Repositories Modeling Requirements and Implementation Experiences", 1992 IEEE, pp. 31-38.
Macchini, Bruno, Reusing Software with ESTRO (Evolving Software Repository), 1992 IEEE, pp. 150-157.
Petro, James, et al., "Model-Based Reuse Repositories—Concepts and Experience", 1995 IEEE, pp. 60-69.
Office Action dated Dec. 17, 2008 cited in U.S. Appl. No. 11/676,170.
U.S. Appl. No. 12/489,245, filed Jun. 22, 2009, Anthony C. Bloesch.
Related U.S. Appl. No. 11/749,616, filed May 16, 2007 (Not Yet Published).
Related U.S. Appl. No. 11/676,170, filed Feb. 16, 2007 (Not Yet Published).
Viewpoints: A Framework for Integrating Multiple Perspectives in System Development, A. Finkelsetin, J. Kramer, B. Nuseibeh, L. Finkelstein, M. Goedicke, http://www.cs.ucl.ac.uk/staff/A.Finkelstein/papers/ijseke92.pdf (27 pages).
A Framework for Expressing the Relationship Between Multiple Views in Requirements Specification, Bashar Nuseibeh, Jeff Kramer, Anthony Finkelstein, Oct. 1994, http://www.cs.ucl.ac.uk/staff/A.Finkelstein/papers/tse94.icse.pdf (20 pages).
Using Multiple Representations Within a Viewpoint, Nigel James Stranger, Nov. 30, 1999, http://eprints.otago.ac.nz/26/01/Thesis.pdf (496 pages).
Andre Van Der Hoek et al., "A Generic, Peer-toPeer Repository for Distributed Configuration Management," Software Engineering Research Laboratory, Department of Computer Science, University of Colorado, Boulder, Colorado. 1999 IEEE Proceedings of ICSE-18, available at http://delivery.acm.org/10.1145/230000/227786/p308-van_der_hoek.pdf?key1=227786&key2=1334925611&coll=Guide&dII=GUIDE&CFID-8075646&CFTOKEN=65412344.
Philip A. Berstein,, et al., "Microsoft Repository Version 2 and the Open Information Model," Microsoft Corporation, One Microsoft Way, Redmond, Washington, available at https://research.microsoft.com/~philbe/Info%20Sys%20on%20MS%20Repository%20for%20Web.pdf.
Edward Sciore, "Versioning and Configuration Management in an Object-Oriented Data Model," VLDB Journal, 3, 77-106, 1994, available at http://www.vldb.org/journalVLDBJ3/P077.pdf.
Neil et al., "A Study of Usability of Web-Based Software Repositories" in: IEEE Software Methods and Tools 2000, Nov. 2000, pp. 51-58.
Weinberger, Ellis, et al., "A security policy for a digital repository", Oct. 2002, 5 pages.
Bustamente, Michele Leroux, "Building a Claims-Based Security Model in WCF", The ServerSide .NET Your Enterprise .NET Community, Mar. 28, 2007, 10 pages.
Worboys, Geoff, et al., "Firebird File and Metadata Security", Dec. 7, 2005, Document version 0.5, 12 pages.
U.S. Appl. No. 12/112,773, filed Apr. 30, 2008 (Not Yet Published).
Office Action dated Jul. 21, 2009 cited in U.S. Appl. No. 11/676,170.
Office Action dated Nov. 16, 2008 cited in U.S. Appl. No. 11/749,616.
Office Action dated Jan. 19, 2010 cited in U.S. Appl. No. 11/626,815.
U.S. Appl. No. 11/749,616, mail date May 6, 2010, Office Action.
U.S. Appl. No. 11/616,815, mail date Jul. 23, 2010, Office Action.

* cited by examiner

DATA MODEL FOR A COMMON LANGUAGE

BACKGROUND

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing components.

Software code is typically written by one or more software developers using some type of integrated development environment (IDE). In many cases, developers are given a set of design instructions, and, using a programming language, draft software code that will implement the functions described in the design specifications. Depending on the nature and scope of the design specifications (or any subsequent modifications thereto), the software program can be both large and complex.

Enterprise software programs, for example, may involve many hundreds or thousands of software files, each file designed to interact with other files within the program and externally with other software programs and/or operating systems. Often, supplemental programs or databases, such as, for example, software repositories, are used to organize, search and maintain the data and metadata which describes the program and its files. Program metadata consists of information such as the structure of program components, behavior of those components, how components and subcomponents may relate to each other, and other characteristics useful for organization and control. File metadata consists of information such as the date the file was last modified, the size of the file, the file's relation to other files within the software program, documentation concerning particular modules or constructs, and other characteristics useful for organization and control.

One approach for organizing a software repository includes storing a software program's objects and their corresponding metadata together using an entity-property-value approach (also called the universal schema approach). Using an entity-property-value approach most data is stored in a table of property ID/value pairs. Thus, a software repository can be organized such that objects are listed alphabetically with the metadata alongside, each portion of metadata corresponding to the appropriate object. For example, a software repository can list a software object and a name and corresponding value for the each property of the software object. Related objects can be, for example, shown as a list of related objects headed by the kind of relationship (e.g., objects related to another object by an automatic generation process).

Using an entity-property-value approach data is stored in a highly uniform way making it relatively easy to build generic repository APIs and browsers. However, due to the typically finer granularity with which software objects are stored (i.e., per property), querying an entity-property-value based software repository can be complex and inefficient. Many objects can include additional relationships to one another (e.g., based on user-preference, code version, access patterns, replication, etc.) causing them to be frequently accessed together. However, these additional relationships are not easily represented using entity-property-value approach. Thus, although these objects are related in additional ways, they typically cannot be easily accessed as a group. Accordingly, sometimes complex queries may be required to access objects individually and then subsequently group them together for performing further operations.

Another approach for organizing a software repository includes storing metadata in XML columns or some other post-relational structure. As opposed to name/value pairs, post-relational structures permit complex data values to be stored in a single table cell. Because some database servers have efficient ways to store XML, an XML column or other post-relational approach can be efficient for hierarchical data (e.g., type definitions of an object oriented software program). Using a post-relational approach, hierarchical data can be flexibly grouped.

However, due to the typically coarser granularity with which software objects are stored (i.e., in a hierarchical tree), querying a post-relational based software repository can be also be complex and inefficient. For example, objects can be related in ways that do not conform well to a hierarchical structure (e.g., based on user-preference, code version, access patterns, replication, etc.) and thus related objects can span different hierarchical trees. Accordingly, queries may be required to access different sub-trees from different post-relational structures and then merge the results together for performing further operations.

Further, most database tools are designed for use with databases based on conventional schemas (as opposed to universal schema or post-relational schema) making their use with entity-property-value and post-relational based software repositories more difficult. As such, not only are these queries typically more complex, a developer must often resort to developing sometimes complex queries without the automated development capabilities included in these database tools.

Accordingly, at the very least, creating software repository queries can consume significant developer resources (that would otherwise be used to develop code). In many cases, creating software repository queries will be beyond the technical expertise of a developer who, while well-trained in code development, may lack expert knowledge in the composition of appropriate database queries.

BRIEF SUMMARY

Embodiments described herein extend to methods, systems, computer program products, and data structures for software repositories. Embodiments are described which enable information pertaining to common language application frameworks and infrastructures to be stored and queried within a computing system.

Embodiments are provided which maintain software repository database schema and database structures which enable information pertaining to an application framework to be stored and which further allows an abstraction of a namespace to be stored along with the application framework so that software repository tools may straightforwardly and efficiently query for data using either infrastructure semantics or programming language semantics.

Embodiments are provided which maintain software repository database schema and database structures which enable method parameter information to be stored, queried, and retrieved together with other method data. Post-Relational database structures are employed in certain embodiments to store information in a column with other method data to enable the formation of queries and to enable straightforward retrieval of parameter information.

Embodiments are also provided relating to the storage, querying, and retrieval of information of complex constructed types within an application infrastructure or framework. Certain embodiments allow that a schema is maintained which represents and stores types using post-relational structures. Further, embodiments provide that type information may be stored and/or retrieved within a column of a relevant software repository item.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the embodiments briefly described above will be rendered by reference to specific embodiments thereof which are illustrated in the appended drawings. Understanding that these drawings depict only example embodiments of the invention and are not therefore to be considered to be limiting of its scope, the invention will be described and explained with additional specificity and detail through the use of the accompanying drawings in which.

DETAILED DESCRIPTION

The present invention relates to the storage and retrieval of information pertaining to a common language application framework or infrastructure. The embodiments of the present invention may comprise a special purpose or general-purpose computer including various computer hardware, as discussed in greater detail below.

Figure 1:
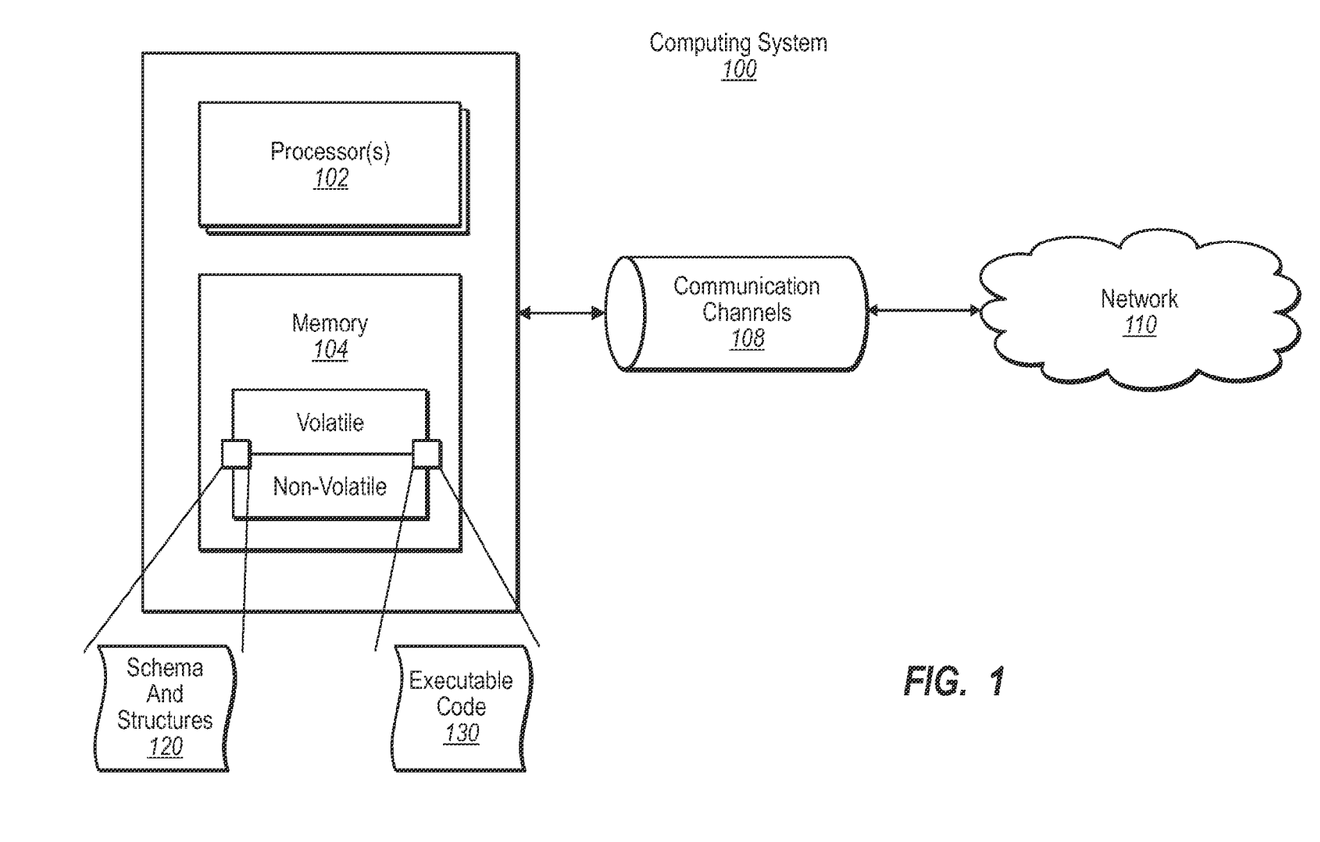
FIG. 1 illustrates a computing system in which embodiments described herein may operate.

FIG. 1 illustrates a schematic diagram of an example computing system 100 that may be used to implement embodiments described herein. The described computing system is only one example of such a suitable computing system and is not intended to suggest any limitation as to the scope of use or functionality of the invention. Neither should the invention be interpreted as having any dependency or requirement relating to any one or combination of components illustrated in FIG. 1.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

Referring to FIG. 1, in its most basic configuration, a computing system 100 typically includes at least one processing unit 102 and memory 104. The memory 104 may be system memory, which may be volatile, non-volatile, or some combination of the two. An example of volatile memory includes Random Access Memory (RAM). Examples of non-volatile memory include Read Only Memory (ROM), flash memory, or the like. The term "memory" may also be used herein to refer to non-volatile mass storage such as physical storage media. Such storage may be removable or non-removable, and may include (but is not limited to) PCMCIA cards, magnetic and optical disks, magnetic tape, and the like.

As used herein, the term "module" or "component" can refer to software objects or routines that execute on the computing system. The different components, modules, engines, and services described herein may be implemented as objects or processes that execute on the computing system (e.g., as separate threads). While the system and methods described herein may be implemented in software, implementations in hardware, and in combinations of software and hardware are also possible and contemplated.

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other computing systems over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments consistent with the principles described herein also include computer-readable media for carrying or having computer-executable instructions or data structures stored thereon. Such computer-readable media can be any available media that can be accessed by a general purpose or special purpose computer. By way of example, and not limitation, such computer-readable media can comprise physical computer-readable media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Generally, software repositories store data about software. The data may include the executable software, itself, the source code necessary to generate the software, and data about the software (i.e., metadata). Software repositories may take the form of databases and the databases may be implemented as flat files, as relational databases comprising tables, and as post-relational databases including post-relation schema, constructs, and structures such as XML columns. Of course, software repositories may take advantage of hybrid technologies comprising any or all of the available database technologies.

An example of an important domain for software repositories is the Microsoft®.NET CLR (the Common Language Runtime) (the "CLR"). The CLR is Microsoft's commercial implementation of the Common Language Infrastructure (CLI). The CLI specification is an international standard (i.e., *Common Language Infrastructure* (CLI), ECMA-335 (4th Ed., June 2006)) for creating development and execution environments in which languages & libraries work together seamlessly and in which applications written in multiple high-level languages can be executed in different system environments without the need to rewrite those applications to take into consideration the unique characteristics of those environments.

Unfortunately, like many common language frameworks, the metadata for the CLR and the CLI is structured to support compilers and runtimes but not browsing and report generation by customers. For example, many programming languages have the concept of namespaces (e.g., "System.Data") that contain classes (e.g. "ClassConstraint") so that "System.Data.ClassConstraint" identifies the class, ClassConstraint, within the namespace System.Data.

However, this namespace concept is not a concept within many common language frameworks or infrastructures (like the CLR and CLI). In many frameworks and infrastructures, the name "System.Data.ClassConstraint" is just a series of semantically meaningless characters which identifies a particular object. Despite not being inherently included within the frameworks or infrastructures, the namespace concept is a natural and useful one for many users. Because of this, it may be useful to structure common language framework domain schema and the database structures implementing those schema in such a way that users can naturally query it with queries like "what are all the classes in System.Data" but still allow compilers to easily query for the actual name of the included classes like "System.Data.ClassConstraint."

Embodiments and principles described herein attempt to strike a balance between three competing forces—true common language framework semantics, programming language and user semantics, and performance. Embodiments and principles described herein provide for systems, methods, data structures, and computer program products which may store common language framework information and metadata which may be efficiently and easily queried by a wide variety of tools and which may be queried in fashions useful to both programmers and to compilers.

Embodiments and principles described herein may be implemented using a variety of tools, including database tools such as Microsoft®'s SQL Server 2005. However, reference to specific tools should be considered examples of a particular implementation or embodiment but not be considered to limit the invention in any way. The principles described herein may be implemented using any suitable tool as those with skill in the art may successfully employ.

In many common language frameworks and infrastructures (e.g., the CLR and CLI), basic types have two part identifiers consisting of an assembly name (e.g., "myD11, Version=1.0.0.1,Culture=neutral, PublicKeyToken=9b35aa32c18d4fb 1") and a type name (e.g., "System.Collections.ArrayList"). However, some programming languages abstract this name as a namespace (e.g., "System.Collections") followed by a type name (e.g., "ArrayList"). Further, other programming languages abstract this name as a path of namespaces (e.g., "System" and "Collections") followed by a type name (e.g., "ArrayList"). Programmers and software developers, too, may sometimes think of such compound names are representative of a namespace.

In both programming language cases, however, the assembly is not specified since, by a common convention, the full namespace and type name should uniquely identify the class. Because of these differences, there are fundamental semantic differences in how types are represented in a common language framework or infrastructure (i.e., an application framework) and how they may advantageously be represented to suit different tools and different needs.

In certain embodiments, it may be beneficial to balance these differences in the representation of types by abstracting namespaces as software repository items. An example of such a schema including a representation of a namespace as a portion of a type's name is given in FIG. 3. Namespaces 310 may be associated with ClassesOrInterfaces 320, which, in turn, are associated with modules 340 and assemblies 330. The schema 300 illustrates a portion of a schema which, in particular embodiments, may be useful in the representation of the .NET CLR.

Within embodiments consistent with the principles herein, there are no nesting of namespaces. Thus, "System" and "System.Collections" may be separate and unrelated namespaces. This separation would allow normal repository tools to straightforwardly and efficiently query for type data using either the semantics of common language frameworks (e.g., the .NET CLR or CLI) or other programming language semantics (as described above). Embodiments employing this principle would also have the advantage of removing common type name prefixes like "System.Collections." from type names and thereby reduce software repository storage costs or improve software repository query efficiency.

The embodiments an principles which are described herein may be practiced using the computing equipment as illustrated in FIG. 1 and described above. In particular, database schemas and structures 120 useful in to practice the principles presented may be contained or instantiated, permanently or temporarily, within computer memory 104 of a computing system 100. Further, the executable code 130 and procedures useful to practice the principles presented may also be stored or instantiated, permanently or temporarily, within the computer memory 104 and may be executed on the processor(s) 102 of the computing system 100.

Figure 4:
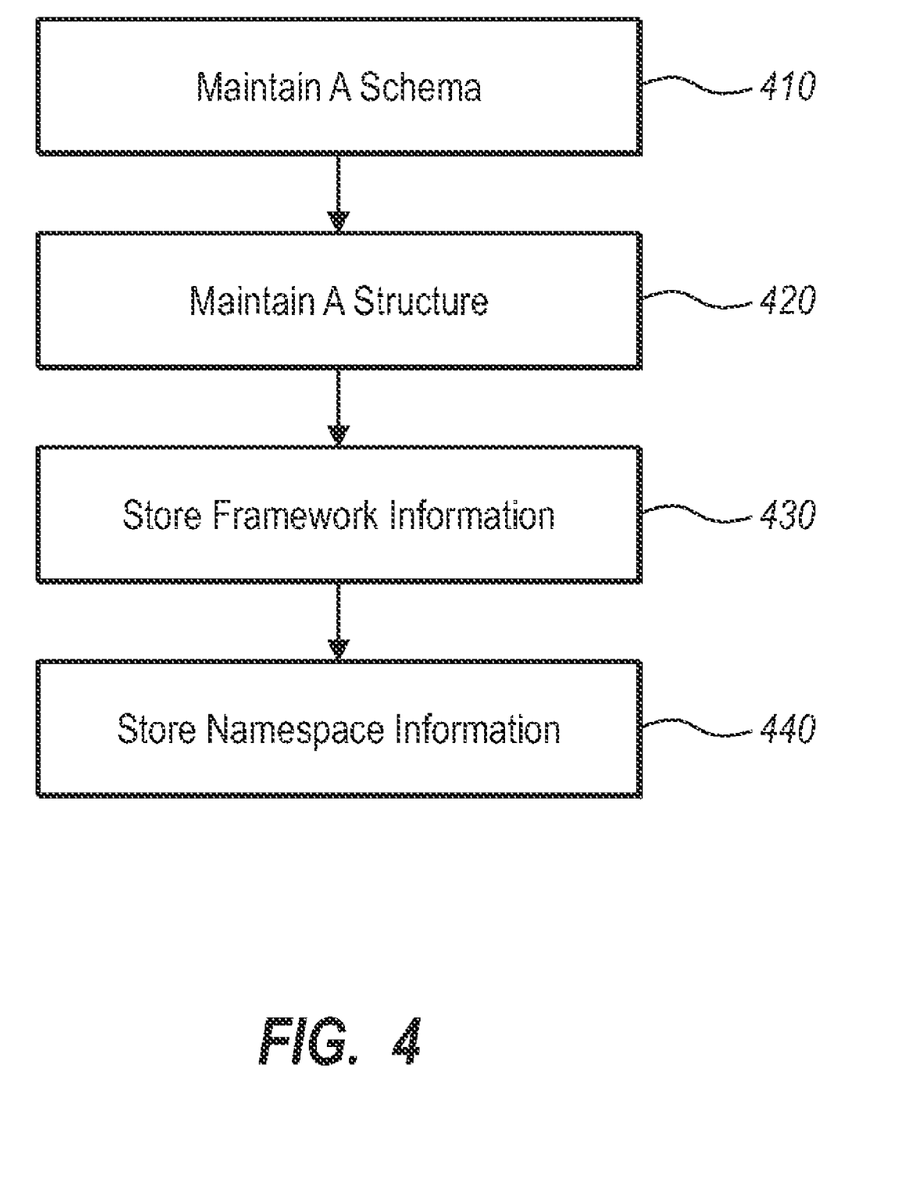
FIG. 4 illustrates a flowchart of a method by which information corresponding to an abstraction of a namespace for an application framework may be stored with application framework information in a queriable format.

FIG. 4 illustrates a flowchart 400 for a method whereby namespace information may be stored and retrieved in connection with a software repository. In order that the namespace be maintained, the method includes an act 410 of maintaining a schema corresponding to an application framework. The application framework may be any application framework or infrastructure. Examples of such application frameworks and infrastructures include the Microsoft®.NET CLR and the CLI. An example schema 200 for the .NET CLR is given in FIG. 2. However, a similar schema may be created for another application framework and variations of the schema in FIG. 2 should also be considered to be consistent with the principles herein. No particular schema should be considered limiting and any schema consistent with the principles herein should be considered to be within the scope of the embodiments herein.

The schema which is defined and maintained by the computing system may comprise post-relational schema constructs. In particular embodiments, it may be advantageous to use constructs like XML columns to represent repository items within the schema.

Once a schema is defined for the application framework or infrastructure, an act 420 of maintaining database structures instantiates and maintains database structures corresponding to the schema of 410 within the computing system. The structures maintained in the act 420 do not necessarily have to physically be structured to correspond exactly as the schema is defined in act 410. There may be different physical, logical, or virtual structures which provide the database structures as described by the schema corresponding to the application framework.

Once a database structure is instantiated and maintained on the computing system, an act 430 of storing information corresponding to some portion of the application framework is employed. In certain embodiments, it may be useful to store complete information corresponding to the application framework or infrastructure. In other embodiments, because of time, space, or other constraints, it may be useful to store only a subset of the complete information corresponding to a particular application framework.

To complete the method 400, there is an act 440 of storing information within the database structure which corresponds to an abstraction of a namespace corresponding to the application framework. Although the application framework, itself, may not actually embody the concept of a namespace, the information corresponding to an abstraction of a namespace may still be stored by application of the principles described herein.

In particular embodiments of the principles herein, the information corresponding to an abstraction of a namespace corresponding to the application framework is queriable. In certain embodiments, standard SQL queries may provide the proper tools for such queries. In other embodiments, specific or ad hoc tools may provide access to such queries. The specific tool used to effect such queries should not be considered limiting and any tool, extant or ad hoc, should be considered consistent with the principles herein.

For example, if a type name in an application framework is "System.Collections.TypeName" the information corresponding to the abstraction of the namespace for the particular application framework which will be stored may include both "System" and "System.Collections". In this fashion, a query for "all the types in System" will return "TypeName" (as well as other types with names such as "System.Foo.AnotherType"). Similarly, a query for all the types within "System.Collections" will also return "TypeName" (as well as other types with names such as "System.Collections.AnotherType" and "System.Collections.Foo.AnotherType").

Consistent with the principles herein are also computer program products which comprise computer-readable storage media and have computer-executable instructions encoded thereon which, when executed by suitable computer systems, will execute the methods or instantiate the embodiments described herein.

Also consistent with the principles herein are computer systems comprising computer-readable memory and computer processors upon which is implemented the embodiments and principles as described herein.

When retrieving information about a type's methods, it is often convenient to also retrieve information about the type's parameters. However, a standard relational representation of a type's parameters would be inefficient since the parameters would need to be stored in a separate table and, most likely, retrieved separately.

By using post-relational database constructs like nested relations, XML columns, and collection types, it may be possible to store, query, and retrieve the parameters of a method in a column together with other method data. For many software repository queries, applying this in certain embodiments may result in performance improvements.

Figure 5:
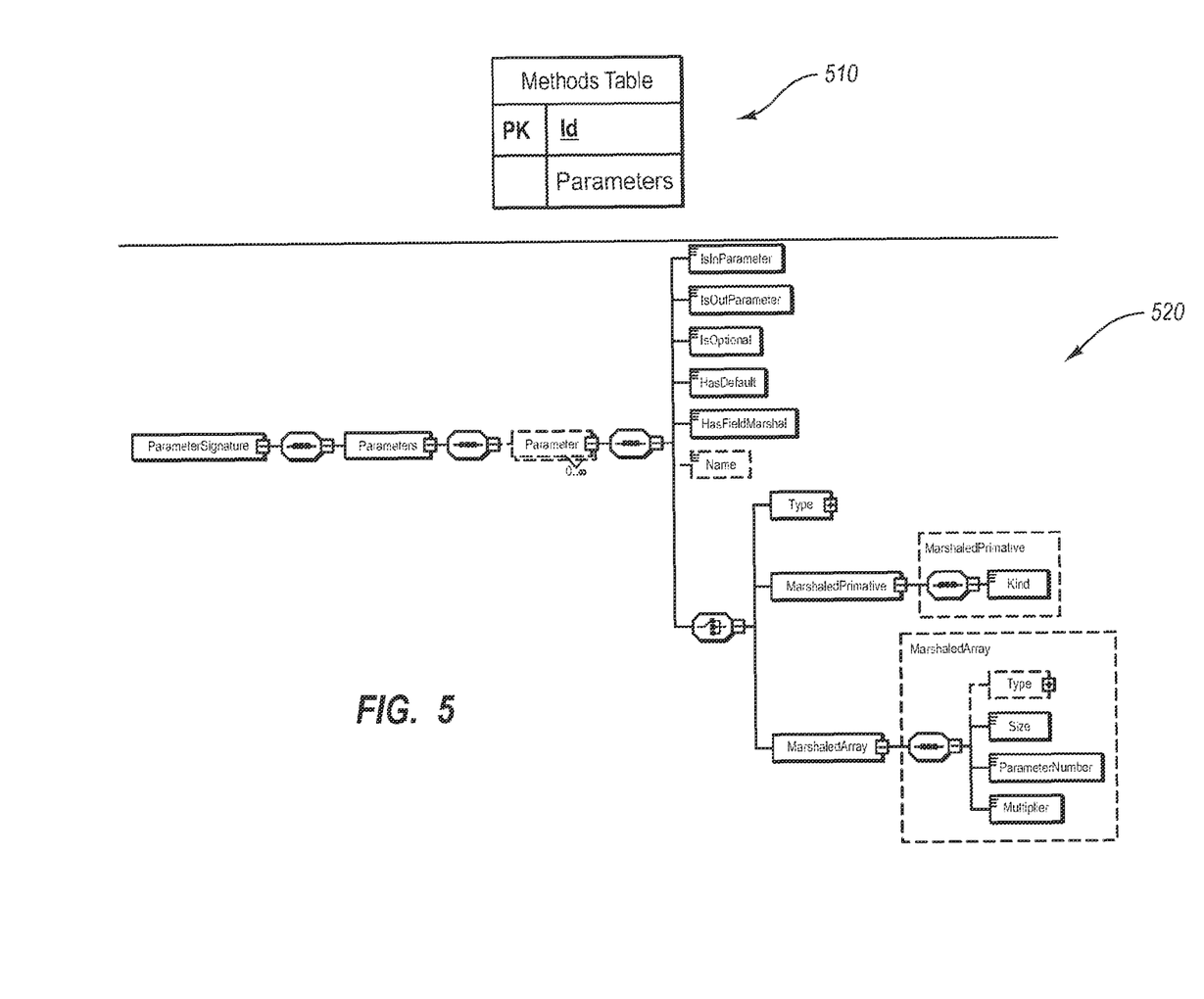
FIG. 5 illustrates database constructs useful for storing parameter information in a database.

FIG. 5 illustrates a schema and structures consistent with these principles. The Methods Table 510 shows how parameters may be contained within a methods column. Diagram 520 illustrates a representation of a method's parameters which may be included within the relevant repository item. The parameter representation 520 is illustrated using a post-relational hierarchical tree.

Figure 2:
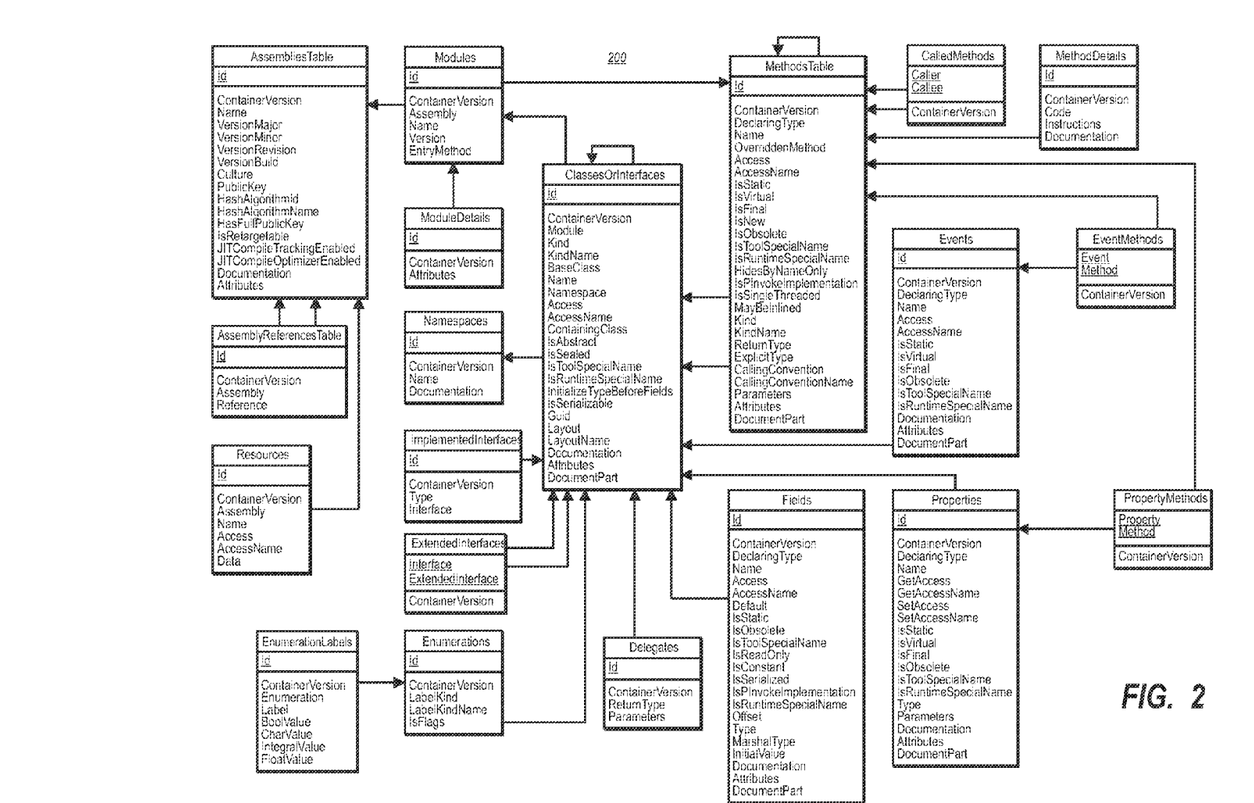
FIG. 2 illustrates a database schema representative of a common language application framework.
Figure 6:
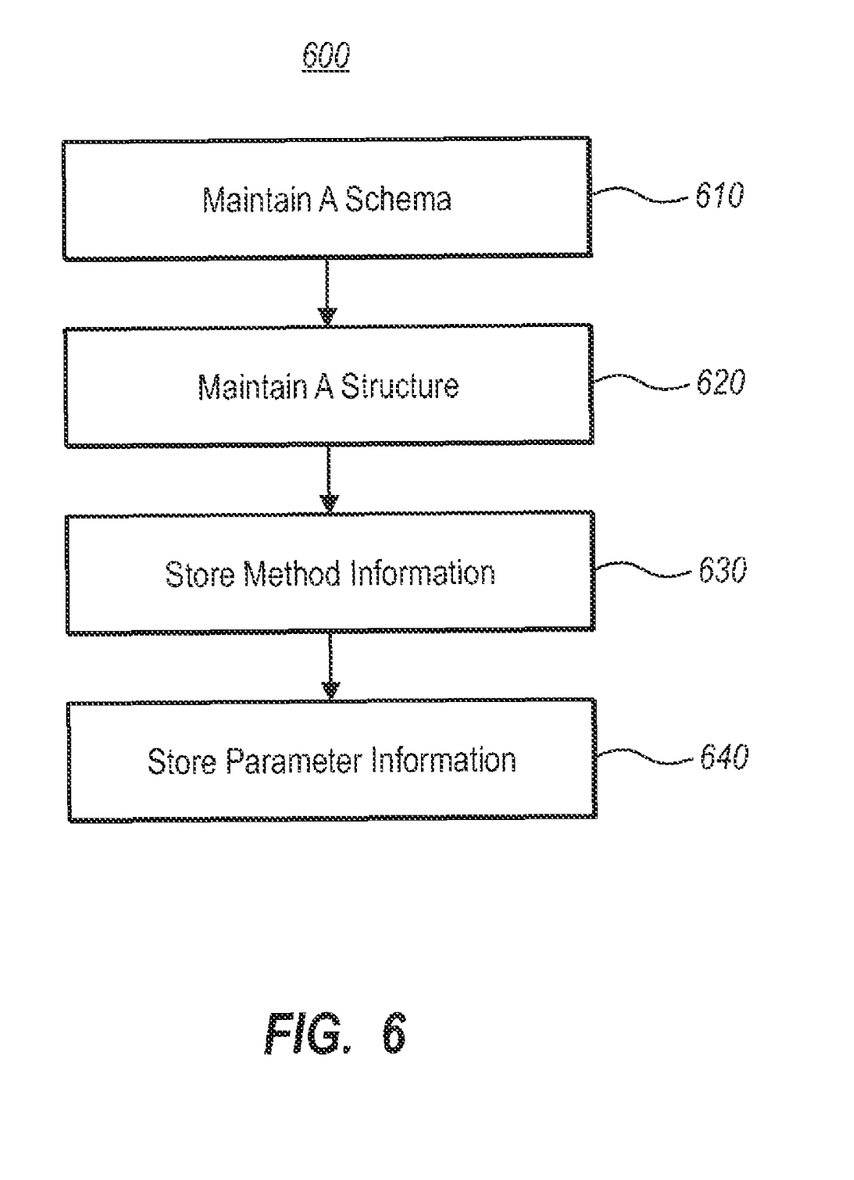
FIG. 6 illustrates a flowchart of a method whereby method information and parameter information may be stored such that the parameter information is retrievable with method information.

FIG. 6 illustrates a flowchart 600 of a method of representing and storing parameter information corresponding to methods as contained within an application framework or infrastructure. The application framework may be any application framework or infrastructure and examples of such application frameworks and infrastructures include the Microsoft®.NET CLR and the CLI. The method includes an act 610 of maintaining a schema corresponding to an application framework. An example schema for the .NET CLR is illustrated in FIG. 2. However, a similar schema may be created for another application framework and variations of the schema in FIG. 2 would also be consistent with the principles herein.

The schema which is defined and maintained by the computing system may comprise post-relational schema constructs. In particular embodiments, it may be advantageous to use constructs like XML columns to represent repository items within the schema. No particular schema should be considered limiting and any schema consistent with the principles herein should be considered to be within the scope of the embodiments herein.

Once a schema is defined for the application framework or infrastructure, an act 620 of maintaining database structures instantiates and maintains database structures corresponding to the schema of 610 within the computing system. The structures maintained in the act 620 do not necessarily have to physically be structured to correspond exactly as the schema is defined and maintained in act 610. There may be different physical, logical, or virtual structures which provide the database structures as described by the schema corresponding to the application framework.

Once a database structure is instantiated and maintained on the computing system, an act 630 of storing information within the database structure corresponding to one or more methods within application framework is employed. In certain embodiments, it may be useful to store complete information corresponding to the application framework or infrastructure. In other embodiments, because of time, space, or other constraints, it may be useful to store only some subset of the complete information corresponding to a particular application framework. In FIG. 2, the column entitled "MethodsTable" illustrates example information corresponding to methods within an application framework which may be stored within the database structure.

The method further includes an act 640 of storing information within the database structure corresponding to parameters of the one or more methods. The information of the one or more methods is such that a method's parameters may be queried and/or retrieved as associated with the methods.

The "MethodsTable" of FIG. 2 illustrates that a field within the column provides parameter information. The diagram 520 of FIG. 5 illustrates an example representation of parameter information which may be stored, queried, and retrieved as associated with a method. The "MethodsTable" 510 of FIG. 5 merely illustrates a shortened version of the MethodsTable as illustrated in FIG. 2.

The actual type of schema or database structure consistent with the principles herein should be considered limited but be considered to include post-relational constructs. The storing of information corresponding to methods of an application framework and the storing of information corresponding to parameters of methods should also be considered to include storing the information within post-relational constructs. Such post-relational constructs include nested relations, XML, XML columns, and collection types.

In particular embodiments of the principles herein, the information corresponding to methods and to methods' parameters is queriable. In certain embodiments, it may be possible to compose and execute queries such as "what are the parameters of "FooMethod." In certain embodiments, standard SQL queries may provide the proper tools for such queries. In other embodiments, specific or ad hoc tools may provide access to such queries. The specific tool used to effect such queries should not be considered limiting and any tool, extant or ad hoc, should be considered consistent with the principles herein. It may also be possible, in certain embodiments, to execute queries such as "what are the types of the parameters of FooMethod" or, as described above, queries like "what are the types of the parameters of the methods within System.Collections."

Consistent with the principles herein are also computer program products which comprise computer-readable storage media and have computer-executable instructions encoded thereon which, when executed by suitable computer systems, will execute the methods or instantiate the embodiments described herein.

Also consistent with the principles herein are computer systems comprising computer-readable memory and computer processors upon which is implemented the embodiments and principles as described herein.

Common language frameworks and infrastructures like the Microsoft® .NET CLR and CLI often allow the types of fields, parameters, variables, and method return values to have an arbitrary complexity. Types are allowed to be defined and constructed in terms of more primitive types in arbitrary ways and to an arbitrary degree of complexity. Further, tool specific extensions to a common language runtime's type system are generally permitted.

Representing such constructed types using a standard relational approach may mean that common software repository queries (e.g., "what type does this method return") would be complex, difficult for a software developer to write, and inefficient to execute against the repository. It may be that the construction of such complex queries involving such constructed types may be well beyond the abilities of many software developers.

Figure 7:
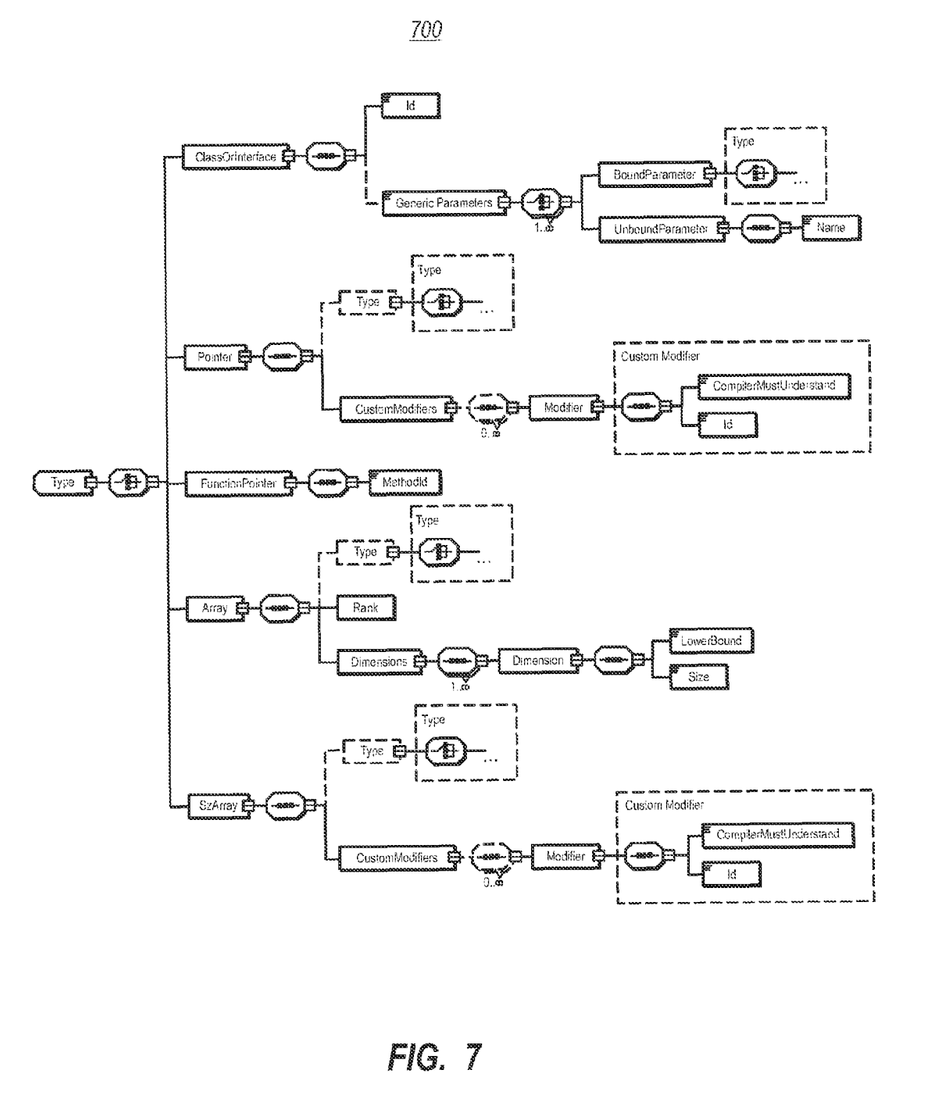
FIG. 7 illustrates a diagram of type information associated with constructed types as may be contained within an application framework.

In certain embodiments, it may be advantageous to represent types using a post-relational schema and/or structure. An XML column is an example of such a suitable post-relational construct. Using such post-relational constructs may produce a compact and queriable representation which may then be stored in a column of a relevant repository item such as a field or a parameter. FIG. 7 illustrates a representation 700 of a such a constructed type.

Figure 8:
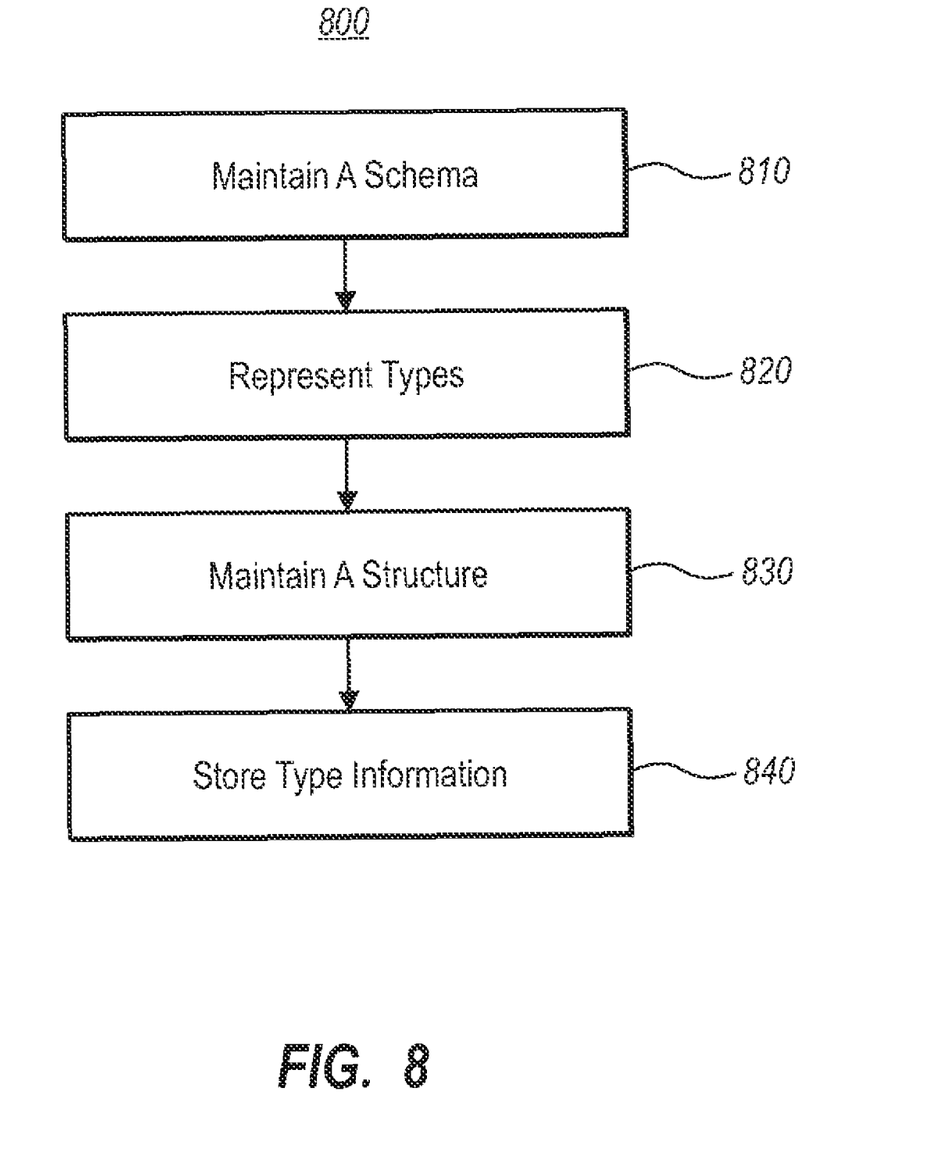
FIG. 8 illustrates a flowchart of a method whereby type information for constructed types within an application framework may be stored in such a way as to be queriable.

FIG. 8 illustrates a flowchart 800 of a method of storing and maintaining information corresponding to one or more types within an application framework or infrastructure. The method includes an act 810 of maintaining a schema corresponding to a software repository in which types may be represented. The types may be constructed types (but are not necessarily limited to such constructed types). The schema may correspond to an entire application framework (or subset thereof) and may be any application framework or infrastructure. Examples of such application frameworks and infrastructures include the .NET CLR and the CLI.

An example schema for the .NET CLR is given in FIG. 2. However, a similar schema may be created for another application framework and variations of the schema in FIG. 2 would also be consistent with the principles herein. No particular schema should be considered limiting and any schema consistent with the principles herein should be considered to be within the scope of the embodiments herein.

The method also includes an act 820 of representing types using a post-relational structure. An example of such post relational structures includes an XML column. The particular structure should not be considered limiting, however, and any structure consistent with the principles herein should be considered to be included.

Once a schema corresponding to a software repository is defined and maintained and types are represented, an act 830 of maintaining database structures instantiates and maintains database structures within the computing system corresponding to the schema. The structures maintained in the act 830 do not necessarily have to physically be structured to correspond exactly as the schema is defined in act 810. There may be different physical, logical, or virtual structures which provide the database structures faithful to and as described by the schema corresponding to the software repository.

The software repository and the represented types may correspond to that of a particular application framework or infrastructure. Examples of such application frameworks and infrastructures include the .NET CLR and the CLI. An example schema for the .NET CLR is given in FIG. 2. However, a similar schema may be created for another application framework and variations of the schema in FIG. 2 would also be consistent with the principles herein. No particular schema should be considered limiting and any schema consistent with the principles herein should be considered to be within the scope of the embodiments herein.

Once a database structure is instantiated and maintained on the computing system corresponding to the schema, the method includes an act 840 of storing information corresponding to one or more types within the database structure. The act 840 of storing stores the information in such a way that the information corresponding to the type can be stored within a column of a relevant repository item.

In certain embodiments, it may be useful to store complete information corresponding to an application framework or infrastructure. In other embodiments, because of time, space, or other constraints, it may be useful to store only a subset of the complete information corresponding to a particular application framework which includes type information.

Type information may be associated with or stored within any relevant repository item. The repository item may represent a field, a parameter, a method return type or value.

The schema may be designed and maintained and the database structure(s) may be instantiated and maintained in such a way as to make the information corresponding to types queriable. In certain embodiments, it is possible to compose and execute such queries as "what is the type description of the parameters of FooMethod" or "what is the type of the return value upon completion of the method FooBarMethod."

Of course, the principles described herein may be practiced singly, separately, or in combination with all the principles described (and in combination with other principles as may also known by those with skill in the art).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer-implemented method for storing a common language application framework in order to produce a queriable representation of the common language application framework, the method comprising:

maintaining a schema in computer memory corresponding to the application framework;

maintaining a database structure in computer memory corresponding to the schema;

storing information within the database structure corresponding to at least some portion of the application framework, including storing the name of a first type in the application framework, the first type being part of a hierarchy that includes a first and a second namespace, wherein the second namespace is a child of the first namespace, and wherein the first type is a child of the second namespace;

storing information within the database structure corresponding to an abstraction of the hierarchy of the first type such that the name of the first type is associated with an identifier of only the first namespace as well as an identifier of a combination of the first and the second namespace;

receiving a query for types of the first namespace of the application framework; and using the abstraction of the hierarchy of the first type to return the first type as a type that is included in the hierarchy of the first namespace.

2. The method of claim 1 wherein the schema comprises a post-relational schema and the database structure comprises post-relational structures.

3. The method of claim 1 wherein the common language application framework is the Common Language Infrastructure (CLI).

4. The method of claim 1 wherein the common language application framework is the NET Common Language Runtime (CLR).

5. A computer program product comprising computer-readable storage media having computer-executable instructions encoded thereon which, when executed by suitable computing equipment, implements the method of claim 1.

6. A computer system comprising computer-readable memory and one or more computer processors upon which is implemented the method of claim 1.

7. The method of claim 1 further comprising:

storing information within the database structure corresponding to one or more methods of the first type; and storing information within the database structure corresponding to parameters of the one or more methods such that information corresponding to the method's parameters may be queried, and retrieved as associated with the methods.

8. The method of claim 7 wherein the database structure into which the one or more methods' information is stored represents at least one of nested relations, XML, or collection types.

9. A computer program product comprising computer-readable storage media having computer-executable instructions encoded thereon which, when executed by suitable computing equipment, implements the method of claim 7.

10. A computer system comprising computer-readable memory and one or more computer processors upon which is implemented the method of claim 7.

11. The method of claim 1 further comprising:

representing the first type within the schema using a post-relational structure; and storing information corresponding to the first type within the post-relational structure, such that the information corresponding to the first type is stored within a column of a relevant repository item.

12. The method of claim 11 wherein the repository item represents a field.

13. The method of claim 11 wherein the repository item represents a parameter.

14. The method of claim 11 wherein the repository item represents a return value.

* * * * *

UNITED STATES PATENT AND TRADEMARK OFFICE
CERTIFICATE OF CORRECTION

Figure 3:
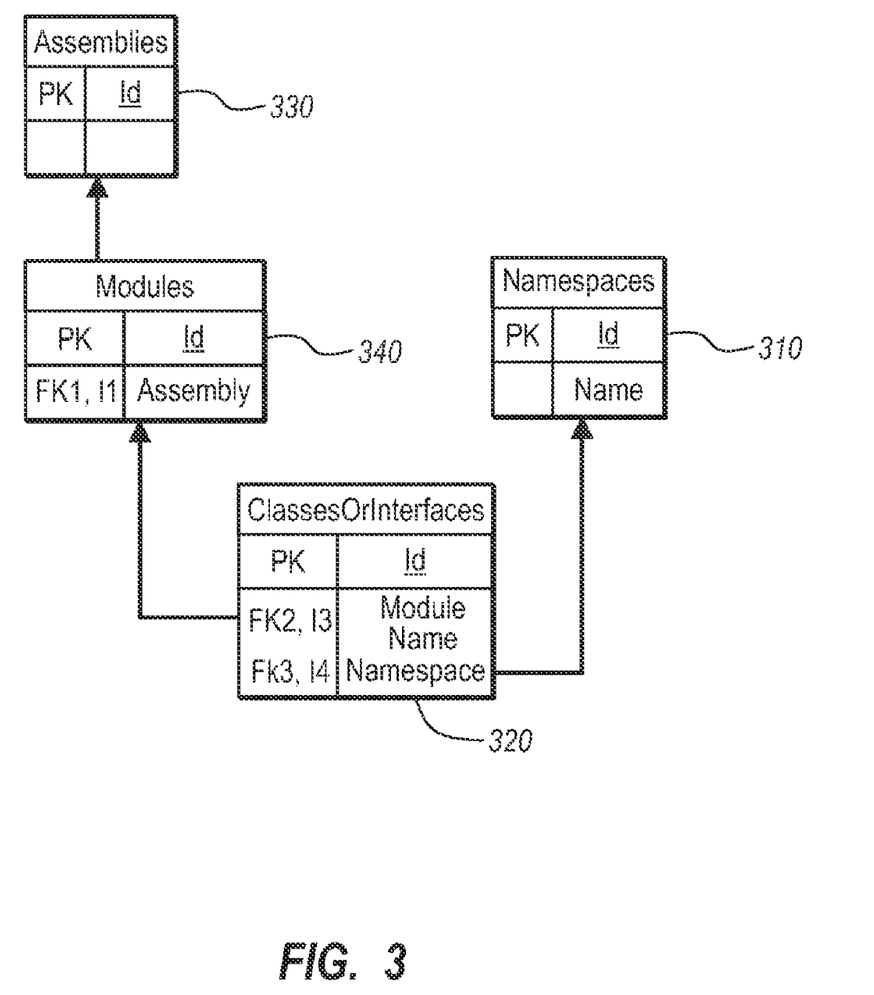
FIG. 3 illustrates a portion of a database schema including constructs for storing an abstraction of a namespace for an application framework.

PATENT NO. : 7,831,625 B2  Page 1 of 1
APPLICATION NO. : 11/749607
DATED : November 9, 2010
INVENTOR(S) : Anthony Christopher Bloesch It is certified that error appears in the above-identified patent and that said Letters Patent is hereby corrected as shown below:

In Drawings, in Sheet 3 of 8, Fig. 3, line 1, above "330" insert -- 300 --.

In Drawings, in Sheet 4 of 8, Fig. 4, line 1, above "410" insert -- 400 --.

In column 12, line 16, in Claim 4, delete "NET" and insert -- .NET --, therefor.

Signed and Sealed this
Seventeenth Day of May, 2011

David J. Kappos
*Director of the United States Patent and Trademark Office*